Figure 1:
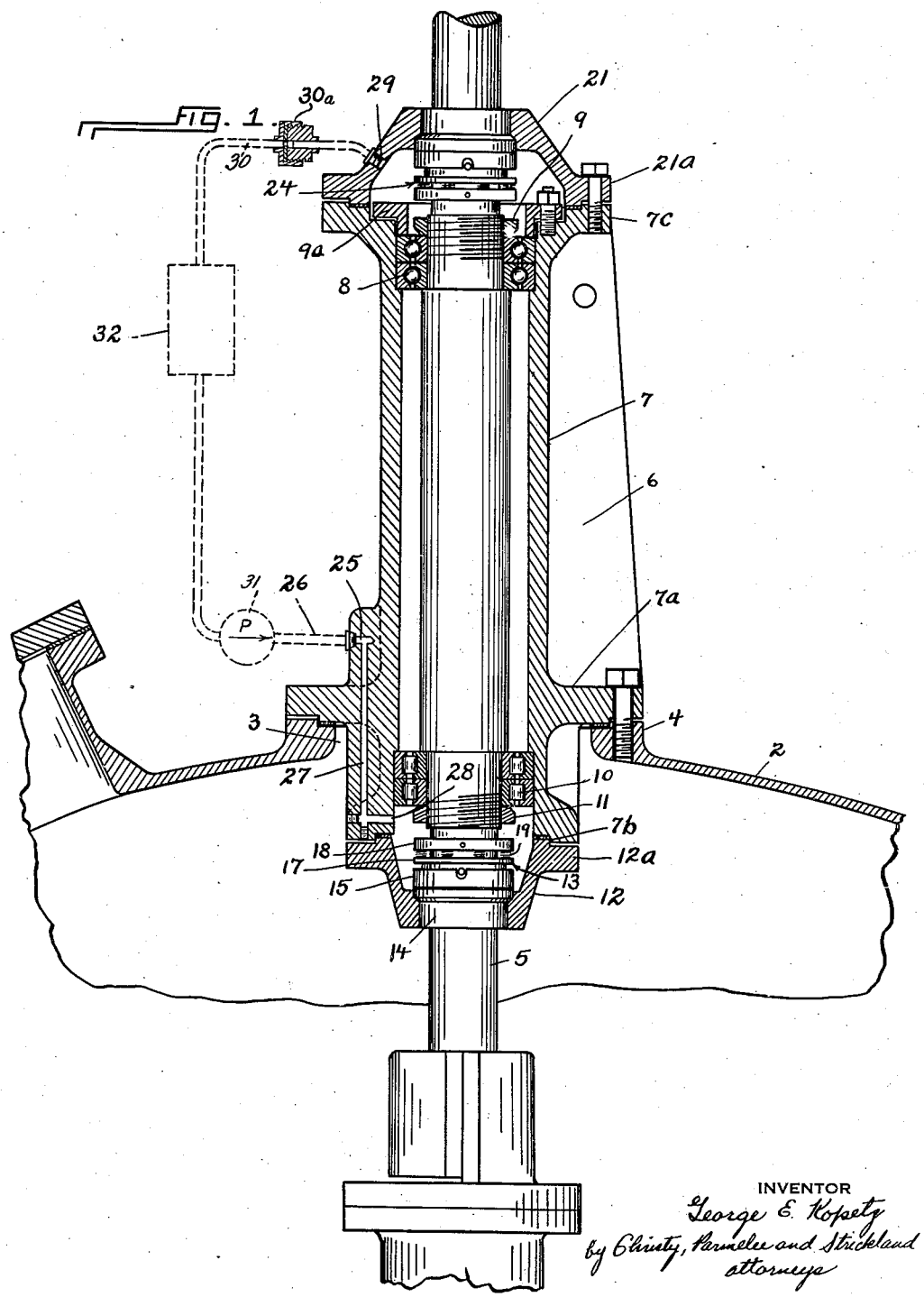

April 23, 1946.  G. E. KOPETZ  2,398,944
LUBRICATED SHAFT BEARING
Filed July 21, 1942   2 Sheets-Sheet 1

INVENTOR
George E. Kopetz
by Christy, Parmelee and Strickland
attorneys

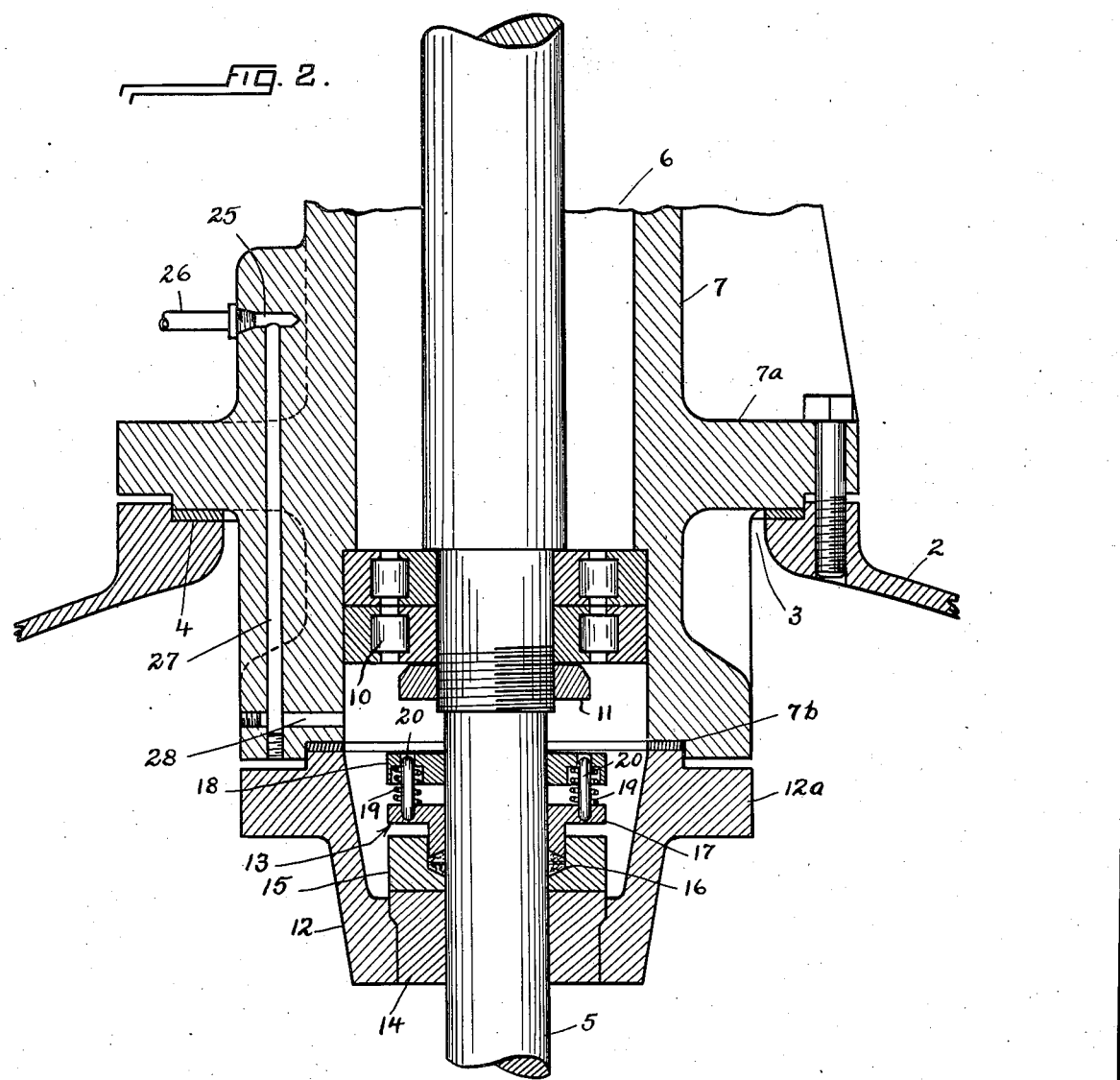

Patented Apr. 23, 1946

2,398,944

UNITED STATES PATENT OFFICE 2,398,944

LUBRICATED SHAFT BEARING

George E. Kopetz, Pittsburgh, Pa., assignor to Blaw-Knox Company, Blawnox, Pa., a corporation of New Jersey Application July 21, 1942, Serial No. 451,703

2 Claims. (Cl. 184—6)

This invention pertains to a bearing for a shaft, more especially a rotating shaft, and is for a bearing in which means is provided for the lubrication of the bearing.

In various types of equipment, it is desirable to provide a bearing which will be constantly lubricated. In many such applications difficulty is encountered in providing a lubricated bearing. This is especially true of shafts which are exposed to vapors or gases which may be absorbed into the lubricant and detrimentally affect its lubricating properties. This is the case, for example, of the agitating shaft in a reaction kettle such as is used in the manufacture of plastics and synthetic rubber. In this specification, I have illustrated my invention as being applied to such a reaction kettle, but it will be understood that the invention is not limited to this specific purpose and may be otherwise embodied and used. For the purposes, however, of clearly pointing out and describing my invention, specific reference will hereafter be made to reaction kettles.

For example, in one process of making synthetic rubber, butadiene and styrene are agitated together with a salt solution at an elevated temperature. Butadiene boils at 24° F. at atmospheric pressure. In the process above referred to, it has a vapor pressure of 100 pounds per square inch. Butadiene is soluble in lubricating oil and its presence in oil in appreciable quantities thins the oil and impairs its value as a lubricant.

According to the present invention, there is provided a bearing structure in which the bearing elements for the shaft are enclosed. A gland at each end of the enclosure seals the enclosure against the escape of oil therefrom. Means is provided for maintaining the lubricant under a pressure slightly greater than the pressure of the atmosphere to which it is exposed. This higher pressure within the enclosure prevents destructive vapors or liquids from entering the enclosure. Additionally, by circulating the oil under pressure, impurities of any nature may be carried away and removed by processing the oil and before the oil is re-circulated. In the case of a shaft which is running in a space where atmospheric pressure exists, the pressure on the lubricant need be only slightly above atmospheric pressure, but where, as in the case of a reaction kettle, one end of the shaft is exposed to relatively high pressure, an even higher pressure is maintained on the oil.

My invention may be readily understood by reference to the accompanying drawings, in which Figure 1 is a sectional view illustrating the upper part of a reaction kettle with a bearing embodying my invention applied to the agitator shaft which passes through the bearing, the circulating system for the lubricant being diagrammatically illustrated. Figure 2 is a fragmentary section on a somewhat larger scale, showing the structure of one form of gland that is particularly applicable for use at the end of the enclosure.

In the drawings 2 designates the upper portion only of a closed vessel, such, for example, as a kettle used for reacting butadiene and styrene in the manufacture of synthetic rubber. The kettle may be of any known or preferred construction, and is provided at the center of the top with an opening 3, around which is provided a seat 4 to receive the bearing for the agitator shaft, the agitator shaft being designated generally as 5 and the bearing structure is designated generally as 6.

The bearing structure 6 comprises a sleeve member 7, which encloses a considerable portion of the length of the upper portion of the agitator shaft and which is of a diameter larger than the diameter of this shaft. It is provided intermediate its ends with a laterally projecting flange 7a that engages the seat 4 and is sealed to the top of the receptacle 2. The flange 7a provides a means for mounting the sleeve in a fixed location.

In the particular embodiment shown, the shaft is provided with a collar 9 adjacent the upper end of the sleeve 7. Below this collar within the sleeve are ball-bearings 8. The ball-bearings are used at this point because the bearings not only center the shaft but take endwise thrust on the shaft, a thrust ring being illustrated at 9a. Inside the lower end of the sleeve is another bearing structure such as the roller-bearings 10, these roller-bearings being held in place on the shaft by a collar 11.

The lower end of the sleeve is closed by a cover member 12, having a portion 12a that is sealed against a seat 7b on the lower end of the sleeve. The cover member 12 provides a support for a gland designated generally as 13. In the specific structure illustrated the cover member 12 carries a fixed gland insert ring 14. Inside the cover is a sealing ring 15, which rotates with the shaft and which bears against the gland insert 14. Within the sealing ring 15 is a stuffing box 16, and a compression ring 17 cooperates with this stuffing box to compress packing in the stuffing box. Fixed on the shaft 5 above the compression ring is a collar 18. Compression springs 19, interposed between the collar 18 and the compression ring 17, urge the compression ring in a direction to compress the packing and at the same time urge the sealing ring against the gland insert. Pins 20 within the spring 19 support the springs and transmit rotary motion from the collar 18 to the compression ring.

The particular form of gland illustrated is one which may be satisfactorily employed and is one known to the art and forms no part of the present invention per se. Any other suitable packing or gland may be provided in the cover member 12.

At the upper end of the sleeve is a similar cover member 21, having a portion 21a that seats on and forms a seal with part 7c at the upper end of the sleeve 7. The cover member 21 carries a packing gland structure designated generally as 24, which is in all respects similar to the packing structure 13 in the lower cover member.

It will be noted that the lower cover member 12 and the lower end of the sleeve, and in fact all parts of the assembly below the supporting flange 7a, are inside the reaction kettle 2. In order to supply lubricant to the bearing, there is an opening 25 above the top of the kettle into which a pipe 26 may be screwed. Leading downwardly from this opening is a passage 27 that terminates in a laterally extending passage 28 that opens into the sleeve below the bearing 10. The cover member 21 may be provided with an opening 29, into which pipe 30 may be screwed, the opening 29 of course being above the ball-bearings 8. One of the pipes 26 may be an oil supply pipe and the other one 30 an oil take-off or discharge pipe, and the direction in which lubrication is circulated is indicated by the arrow. In the drawings the pipe 26 is illustrated as being connected with oil pump 31. The pump 31 is in turn connected with the reservoir 32 and the pipe 30 discharges into the reservoir 32. Should the lubricant circulating system not develop sufficient pressure inside the sleeve 7, a metering device such as a restricted orifice as indicated at 30a may be placed in the pipe 30, it maintaining a back pressure inside the casing. The unit 32, in addition to being a reservoir, may be a filtering or processing unit of the type well known in the art, or may be connected to a filtering and processing unit.

In the operation of the bearing a lubricant is supplied through the pipe 26, and it may at all times be kept at a pressure above the highest pressure to which either end of the sleeve is subjected. By circulating the oil, clean oil may be constantly supplied to the bearings and impurities of either a solid or liquid character may be flushed away. Because of the oil being kept at a higher pressure than the atmosphere surrounding any part of the bearing, there is little possibility of the vapors or impurities in the atmosphere getting into the oil, and by the use of effective packings around the shaft at each end of the sleeve and outside of each of the two bearings, the escape of oil may be prevented.

In the drawings, I have illustrated one specific embodiment of my invention as applied to an agitating kettle, but as hereinbefore stated, this is for purposes of illustration and discloses an application to which the bearing of the present invention is especially adapted; but the device may be constructed in other ways and used for other purposes within the contemplation of my invention and under the scope of the following claims.

I claim as my invention:

1. In an agitator bearing support for reaction kettles operating at non-atmospheric pressure, an agitator shaft, a sleeve member surrounding a portion of the agitator shaft intermediate the ends of said shaft, said sleeve member having an internal diameter throughout its length greater than the diameter of the agitator shaft so as to provide a continuous open space around the shaft from one end of the sleeve to the other for the circulation of lubricant therealong, said sleeve having a transverse external flange for securing it to a reaction kettle, axially spaced upper and lower bearings inside the sleeve, the said bearings being anti-friction bearings through which lubricant may flow, a cover member at each end of the sleeve forming a closure for the sleeve, there being a packing gland about the shaft in each cover member, a duct leading from a point above said flange to a point below the lower bearing and above the lower cover member, means at the other end of the sleeve between the upper bearing and the upper cover member providing a passage for the flow of lubricant, and means externally of the sleeve for circulating fluid under pressure into one end of the sleeve and out the other.

2. An agitator bearing support for reaction kettles comprising an agitator shaft, a bearing structure for said shaft, said structure comprising a sleeve surrounding the shaft and having an internal diameter throughout its length greater than the diameter of the shaft to provide a continuous lubricant circulating passage around the shaft within the sleeve, a flange on the exterior of the sleeve for securing the structure on a reaction kettle in which the agitator is mounted, a bearing for the shaft adjacent each end of the sleeve, one of said bearings being a radial bearing and one of said bearings being a thrust bearing, a cover element at each end of the sleeve through which the shaft passes, the said cover elements forming closures for the sleeve at each end thereof, each of said cover elements having a packing therein about the shaft, means extending along the structure from a point above the flange on the sleeve to a point adjacent the inner end of the sleeve providing a lubricant circulating passage which terminates below the lowermost bearing in the sleeve, and means above the other bearing and adjacent the packing at the top of the sleeve providing another circulating passage, one of said passages being for the continuous flow of lubricant into the sleeve and the other being for the continuous flow of lubricant from the sleeve.

GEORGE E. KOPETZ.